L. Anderson,
Hanging Reciprocating Saws,
Nº 26,823. Patented Jan. 17, 1860.
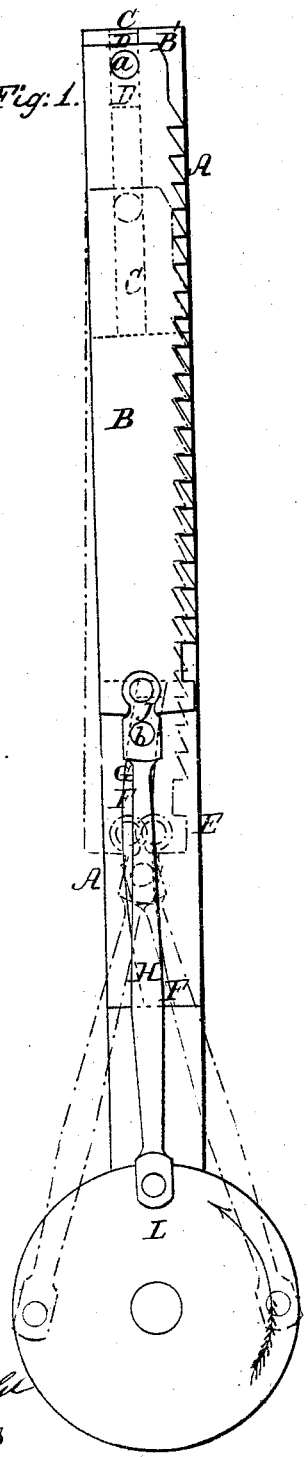
Fig: 1.
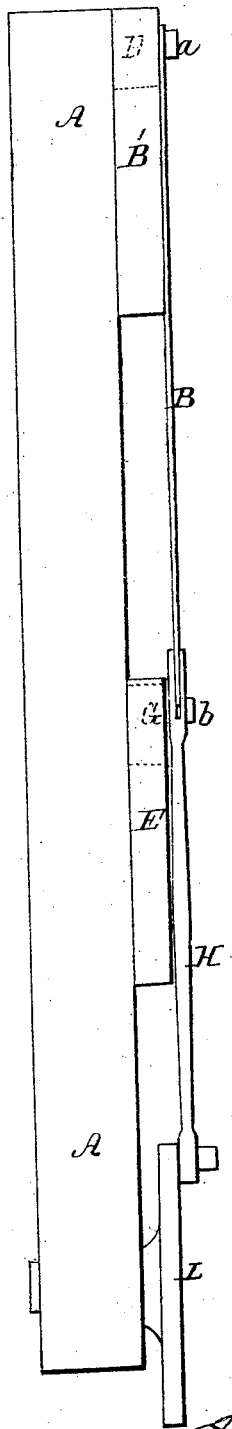
Fig: 2.
Witnesses
J. A. Marsfield
S. T. Loomis
Inventor;
L. Anderson

UNITED STATES PATENT OFFICE.

LEONARD ANDERSON, OF PAINESVILLE, OHIO.

METHOD OF HANGING RECIPROCATING SAWS.

Specification forming part of Letters Patent No. 26,823, dated January 17, 1860; Reissued August 2, 1864, No. 1,733.

*To all whom it may concern:*

Be it known that I, LEONARD ANDERSON, of Painesville, in the county of Lake and State of Ohio, have invented a new and useful Improvement in Hanging Reciprocating Saws; and I do hereby declare that the following is a full, clear, and exact description thereof, reference being had to the accompanying drawings and to the letters of reference marked thereon, of which—

Figure 1 represents a side view of my mode of hanging the saw showing it in two positions. Fig. 2 is a front view of the same.

Similar letters of reference indicate like parts in both figures.

The nature of my invention consists in pivoting the upper end of the saw to a vertical sliding block and the lower end to the short arm of a pitman rod, which has its fulcrum in a block sliding in a circular groove, so that the saw in its movement will have an alternate reciprocating, and, at the same time, a vibrating motion, and be thrown back during its upward stroke described as follows:—

A represents the saw frame, and B, the saw. At the upper end of the frame is a block, B', having a vertical slot, C, into which is fitted, and works a slide block, D; to this block the saw is pivoted at $a$. The lower end of the frame has a similar block, E, fixed to it, but this block has a slotted arc, F', into which works a slide-block, G; and to this block, G, is pivoted, at $b$, a pitman rod, H, the short arm, J, of which is pivoted to the saw, B. The saw is thus hung independently of the block G, its (the saws) lower end being carried and governed by the short arm J, of the pitman. The pitman, H, is operated by a crank wheel, L.

The action upon the saw by this above-described arrangement is to throw the saw back during its upward movement because the upper end of the pitman H, turns as the saw rises, upon the pivot ($b$) and throws the short arm J, backward thus carrying the lower end of the saw back, away from the log. The sweep of the slotted arc F', and the length of the short arm J, correspond, or are equal, so that the short arm J, will carry the saw back to a distance equal to the sweep of the arc F'. The full backward movement of the saw is reached when the pivot ($b$) has arrived at the middle of the arc F'. When the pivot ($b$) has reached the middle of arc F', the pitman begins to turn in a contrary direction on its pivot ($b$) so as to carry the short arm J, forward and with it the lower part of the saw; and by the time the pitman has reached the end of its upward stroke the bottom part of the saw will have been carried so far forward that the cutting edge stands in a vertical line. This vertical line is maintained during the whole descent of the saw, because the upper end of the pitman continues to turn forward on its pivot ($b$) and this carries forward the short arm J, and lower part of the saw just as much and just as fast as the block G, by following the curve or sweep of arc F', carries back the pivot ($b$) of the pitman, in descending.

When the pivot ($b$) in its descent, passes the middle of the arc F', the pivot ($b$) following the form of the slot, begins to be carried forward; but at the same time the pitman turns in the contrary direction on pivot ($b$) carrying with it the arm J; so that the tendency of pivot ($b$) to carry the arm J, and saw forward, during the last half of the stroke is neutralized or met by the swinging of the pitman on its pivot ($b$). This swinging of the pitman on the pivot $b$, is just as far and just as fast as the pivot is carried forward, by the curve of the slot, so that the saw descends on a vertical line, but in ascending, the lower part of the saw is carried out from the stuff, as before described.

Among the advantages of this peculiar movement of the saw are the following: The saw cuts itself clear at every stroke, carrying the saw dust all below and throwing none of it on top of the log, never clogs in the largest log, avoids all the friction and wear consequent on a saw rising with the backs of its teeth against the log and choked with dust, which in a mill with the continuous feed or "rack and pinion feed" consumes nearly as much power on its upward stroke, as is required to do the cutting. With my mode of hanging a saw we have cut through a four foot log with the same speed, feed and power that mills with the ordinary mode of hanging use in cutting a log 20 inches through.

With my mode of hanging, the saw needs dressing only about one third as often as by the ordinary plan for the teeth are subject to wear only from actual cutting and not from being snubbed against the log on the upward stroke; so that a saw will last about three times as long.

The parts in my improvement are so constructed that there is little weight of metal but much strength. The pitman, I make from 3 feet 8 inches to 5 feet long, all iron and with crossheads all complete only weigh from 35 pounds to 50 pounds and will stand a very high speed, having run them on trial as high as 575 revolutions per minute.

In my improvement I use the ordinary pitman for all the purposes of a pitman connected directly to the saw; but I further insert a movable fulcrum into the pitman just below its connection with the saw, thus making a lever of it. Now if that fulcrum moved in a right line or straight slot, every revolution of the crank would give us a curved cutting line forward from the vertical line of the saw, and the return stroke would be on a similar curve back from the vertical line of the saw up to the vertical again. This is an old and well known plan, but is useless as the saw tears the lumber badly on the bottom side of the log. I tried this plan but was obliged to give it up. I then substituted such a curved slot as should counteract the curved cutting line and make it a vertical or straight cutting line and throw the curve all onto the return stroke. Now the pitman thus arranged acts as a lever only so far as the receding motion is concerned.

Another advantage of my improvement is the facility with which extra large logs can be cut. Suppose a log 4 feet through with a 12 inch crank, (which is the ordinary length of saw cranks), the saw has 2 feet stroke. Now there are 2 feet of that saw which are continually in the log and with the ordinary saw motion the saw cannot clear itself from dust; therefore the lighter feed must be put on, and sometimes the feed must be thrown off entirely to let the dust work out; but with my plan the saw makes its cut, recedes and leaving its dust in the kerf, then rises, strikes in again and carries the dust already made, down through, thus keeping itself entirely clear, so that we can carry a fast feed and with large logs can make lumber faster than with small or medium sized logs, while other mills on large logs, cannot make lumber as fast as on smaller ones. No saw that returns on its upward stroke in the same track as its downward stroke can free itself from dust.

Having thus described my invention I claim as new and desire to secure by Letters Patent—

The combination of the saw B, with the short arm J, of the pitman H, pin (b) and slotted arc F, when the upper end of the saw moves in a right line substantially as described, so that the saw will be carried backward during its upward stroke, but will descend on a vertical line, all as herein set forth.

LEONARD ANDERSON.

Witnesses:
I. A. MONSPIEHER,
S. T. LOOMIS.